United States Patent [19]

Summers

[11] Patent Number: 4,923,842

[45] Date of Patent: May 8, 1990

[54] LANTHANUM CONTAINING CATALYST FOR TREATING AUTOMOTIVE EXHAUST

[75] Inventor: Jack C. Summers, Tulsa, Okla.

[73] Assignee: Allied-Signal Inc., Morris Township, Morris County, N.J.

[21] Appl. No.: 255,245

[22] Filed: Oct. 11, 1988

[51] Int. Cl.$^5$ .............................................. B01J 23/10
[52] U.S. Cl. ..................................... 502/261; 502/303
[58] Field of Search ......................... 502/261, 262, 303

[56] References Cited

U.S. PATENT DOCUMENTS

| | | | |
|---|---|---|---|
| 3,767,453 | 10/1973 | Hoekstra | 117/46 CA |
| 3,785,998 | 1/1974 | Hoekstra | 252/477 R |
| 3,873,469 | 3/1975 | Foster et al. | 252/455 R |
| 3,920,583 | 11/1975 | Pugh | 252/465 |
| 4,283,308 | 8/1981 | Ohara et al. | 502/303 |
| 4,492,769 | 1/1985 | Blanchard et al. | 502/262 |
| 4,528,279 | 7/1985 | Suzuki et al. | 502/200 |
| 4,591,580 | 5/1986 | Kim et al. | 502/303 |
| 4,650,782 | 3/1987 | Onal | 502/339 |
| 4,702,897 | 10/1987 | Onal | 423/213.5 |
| 4,760,044 | 7/1988 | Joy, III et al. | 502/303 |
| 4,791,091 | 12/1988 | Bricker et al. | 502/262 |
| 4,808,564 | 2/1989 | Matsumoto et al. | 502/303 |

FOREIGN PATENT DOCUMENTS 71537 4/1987 Japan .
71538 4/1987 Japan .

*Primary Examiner*—Carl F. Dees
*Attorney, Agent, or Firm*—Frank S. Molinaro; Harold N. Wells; Roger H. Criss

[57] ABSTRACT

This invention relates to an improved catalytic composite for treating an exhaust gas comprising a first support which is a refractory inorganic oxide, having dispersed thereon at least one oxygen storage component and at least one noble metal component and having dispersed immediately thereon an overlayer comprising lanthanum oxide and optionally a second support which is a refractory inorganic oxide. The first and second support may be selected from the group consisting of alumina, silica, titania, zirconia and aluminosilicates with alumina being preferred. Additionally, the noble metal component may be selected from the group consisting of platinum, palladium, rhodium, ruthenium and iridium. The oxygen storage component is an oxide of a metal which includes cerium, iron, nickel, cobalt lanthanum, neodymium, praesodymium, etc. and mixtures thereof. This invention also relates to a process for treating automotive exhaust comprising contacting the exhaust with the catalytic composite described above.

The catalytic composite shows improved activity, especially for eliminating $NO_x$, after extensive durability testing and also minimizes the formation of $H_2S$.

16 Claims, No Drawings

LANTHANUM CONTAINING CATALYST FOR TREATING AUTOMOTIVE EXHAUST

Catalysts which can be used for treating automotive exhaust are well known in the art. More specifically, these catalysts typically contain platinum and/or palladium and rhodium and are known as three-way catalysts (TWC) or three component control catalysts. Stabilizers and promoters have also been used to improve the activity of these catalysts. For example, U.S. Pat. No. 4,528,279 describes the use of cerium/lanthanum promoters in conjunction with noble metals such as platinum and rhodium as the active phase of the catalyst. The purpose of adding promoters such as cerium or lanthanum is to improve the activity and the durability of the three-way catalysts after prolonged use on a vehicle. U.S. Pat. No. 4,591,580 teaches the use of a catalytic composite containing lanthanum oxide, cerium oxide and an alkali metal oxide.

Although it is recognized that lanthanum oxide is a good promoter, we have observed that the activity of lanthanum containing catalysts significantly deteriorates under high temperature fuel lean operation. The higher the temperature to which the catalyst is exposed, the greater the rate of deterioration. Applicant has found a way to deposit lanthanum oxide onto a catalyst which takes advantage of the promoter property of lanthanum oxide but which minimizes the deterioration of the catalyst.

It is believed that the deterioration occurs because of a chemical interaction between the lanthanum oxide and the noble metals. Applicant has found that by applying the lanthanum oxide as an overlayer, the amount of contact between the noble metals and the lanthanum oxide is minimized, yet the lanthanum promotes the activity of the catalysts and reduces the deterioration of the catalyst.

Another problem common to catalysts which contain large amounts of rare earths is that these catalysts form noticeable amounts of hydrogen sulfide during certain modes of vehicle operation. Hydrogen sulfide is formed from the sulfur compounds which are present in the fuel. During combustion the sulfur is converted to sulfur dioxide ($SO_2$) which can react with oxygen in the presence of a catalyst to form sulfur trioxide ($SO_3$) which is then converted to sulfates ($SO_4^=$) by reaction with water. Under fuel rich conditions the $SO_2$ reacts with hydrogen ($H_2$) to form hydrogen sulfide ($H_2S$). The rare earths which are commonly used as oxygen storage components also store sulfates during fuel lean operation and release it under fuel rich conditions. Because of this storage phenomenon, the concentration of hydrogen sulfide is much larger than would have been anticipated based on the sulfur content of the fuel. Consequently, the resultant odor is quite noticeable.

The instant catalytic composite also has the advantage of minimizing the formation of hydrogen sulfide. The lanthanum oxide overlayer appears to trap the sulfur species so that they do not interact with the noble metals, thereby minimizing the formation of hydrogen sulfide.

The prior art does disclose layered catalytic composites. For example, U.S. Pat. No. 3,873,469 discloses a multilayer support on which is deposited a noble metal. U.S. Pat. Nos. 4,702,897 and 4,650,782 disclose a catalyst consisting of a support having deposited thereon a catalytic component and having dispersed thereon a protective coating of titania or zirconia.

Additionally, Japanese Public Disclosure Nos. 71537/87 and 71538/87 disclose a catalytic composite consisting of a ceramic carrier having dispersed thereon a catalytic layer containing one or more of Pd, Pt and Rh and an alumina layer containing one or more oxides of Ce, Ni, Mo and Fe. However, the stated advantage of the 71537 invention is that the oxides, which are oxygen storage components, renew the catalytic surface. This is accomplished by having the oxygen storage component in contact with the catalytic surface.

The instant invention differs significantly from the above prior art. In contrast to the catalyst of U.S. Pat. No. 3,873,469 which has two layers of support materials on which is deposited a catalytic material, the instant invention consists of a support material which has deposited thereon a noble metal and which has dispersed thereon a lanthanum oxide overlayer. Further, U.S. Pat. Nos. 4,702,897 and 4,650,782 disclose the use of a titania or zirconia overlayer to protect the catalytic element from poisons. The instant invention employs an overlayer of lanthanum oxide which is a promoter and an oxygen storage component. Neither zirconia nor titania are known as oxygen storage components or activity promoters for automotive catalysts.

Finally, the layered catalysts of Japanese Public Disclosure Nos. 71537 and 71538 contain a layer of alumina plus one or more oxides of Ce, Ni, Mo and Fe. The purpose of this layer is to contact the oxygen storage component with the catalytic surface. In contrast to these disclosures, the purpose of the layer of the instant catalyst is to separate the lanthanum oxide from the catalytic surface.

Data obtained on the instant catalyst shows that it has unexpected advantages over prior art catalysts. These are: (1) increased resistance to deterioration and (2) decreased formation of hydrogen sulfide. For example, a palladium/rhodium catalyst with an overlayer of lanthanum oxide and alumina is more effective at converting nitric oxide (to nitrogen and oxygen) than a catalyst without an overlayer, even after an automotive engine durability test. Additionally, a platinum/rhodium catalyst with a lanthanum oxide overlayer produces less hydrogen sulfide than a similar without an overlayer.

SUMMARY OF THE INVENTION

This invention relates to a catalytic composite and a process for using said composite to treat exhaust gas from an internal combustion engine. The catalytic composite comprises a first support having dispersed thereon an oxygen storage component and at least one noble metal component selected from the group consisting of platinum, palladium, rhodium, ruthenium and iridium and having dispersed immediately thereon an overlayer comprising lanthanum oxide and optionally a second support, said first and second support both being a refractory inorganic oxide selected from the group consisting of alumina, silica, titania, zirconia, aluminosilicates and mixtures thereof.

Accordingly, one specific embodiment of the invention comprises a ceramic monolithic honeycomb carrier having dispersed thereon an alumina support, the alumina having dispersed thereon palladium, rhodium and ceria and having dispersed immediately thereon an overlayer comprising lanthanum oxide and alumina.

It is another embodiment of this invention to provide a process for treating an automotive exhaust gas while minimizing the formation of hydrogen sulfide comprising contacting said automotive exhaust with a catalytic composite comprising a first support having dispersed thereon at least one oxygen storage component and at least one noble metal component selected from the group consisting of platinum, palladium, rhodium, ruthenium and iridium and having dispersed immediately thereon an overlayer comprising lanthanum oxide and optionally a second support, said first and second support both being a refractory inorganic oxide selected from the group consisting of alumina, silica, titania, zirconia, aluminosilicates and mixtures thereof.

Other objects and embodiments will become more apparent after a more detailed description of the invention.

DETAILED DESCRIPTION OF THE INVENTION

As indicated, the present invention relates to a catalytic composite and a process for treating an automotive exhaust using said catalytic composite. One essential feature of the catalyst is a first support which is a refractory inorganic oxide selected from the group consisting of alumina, silica, titania, zirconia aluminosilicates, and mixtures thereof with alumina being preferred. When alumina is the desired first support, any alumina which is well known in the art, such as described in U.S. Pat. No. 4,492,769, may be used.

The first support of the instant invention can be used in any configuration, shape, or size which exposes the noble metal component dispersed thereon to the gas to be treated. The choice of configuration, shape and size of the support depends on the particular circumstances of use of the catalytic composite of this invention. One convenient shape which can be employed is particulate form. In particular, the first support can be formed into shapes such as pills, pellets, granules, rings, spheres, etc. The particulate form is especially desirable where large volumes of catalytic composites are needed, and for use in circumstances in which periodic replacement of the catalytic composite may be desired. In circumstances in which less mass is desirable a monolithic structure is preferred.

Thus, a specific example of the present invention is alumina spheres which may be continuously manufactured by the well known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 149°–205° C. and subjected to a calcination procedure at a temperature of about 455°–705° C. for a period of about 1 to about 20 hours. This treatment effects conversion of the alumina hydrogel to the corresponding crystalline gamma-alumina. See the teachings of U.S. Pat. No. 2,620,314 for additional details.

If it is desirable to employ a monolithic form, it is usually most convenient to employ the first support as a thin film or coating deposited on an inert carrier material, which provides the structural support for said first support. The inert carrier material can be any refractory material such as a ceramic or metallic material. It is preferred that the carrier material be unreactive with the first support and not be degraded by the gas to which it is exposed. Examples of suitable ceramic materials include sillimanite, petalite, cordierite, mullite, zircon, zircon mullite, spodumene, alumina-titanate, etc. Additionally, metallic materials may be used. Metallic materials which are within the scope of this invention include metals.and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow, e.g., ceramic foams, honeycomb structures. It is preferred that the configuration be a honeycomb configuration. The honeycomb structure can be used advantageously in either unitary form, or an an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453.

The first support may be deposited on said solid monolithic carrier by any conventional means known in the art. One convenient method is by dipping the solid carrier into a slurry of said first support. As an example when alumina is the desired first support, the preparation of a slurry from alumina is well known in the art and consists of adding the alumina to an aqueous solution of an acid such as nitric, hydrochloric, sulfuric, etc. The concentration of acid in said aqueous solution is not critical but is conveniently chosen to be about 1 to about 4 weight percent. Enough alumina should be added to said aqueous acid solution such that the specific gravity of the final slurry is in the range of about 1.1 to about 1.9. The resultant mixture is ball milled for about 2 to 24 hours to form a usable slurry which can be used to deposit a thin film or coating onto the monolithic carrier.

The actual coating procedure involves dipping the monolithic carrier into said first support slurry, blowing out the excess slurry, drying and calcining in air at a temperature of about 350° to about 800° C. for about 1 to about 2 hours. This procedure can be repeated until the desired amount of first support on said monolithic carried is achieved. It is preferred that the first support, such as alumina, be present on the monolithic carrier in amounts in the range from about 28 g of support per liter of carrier volume to about 355 g of support per liter of carrier volume, where the volume is measured by the exterior dimensions of the monolithic carrier structure.

A second feature of the catalytic composite of this invention is that said support has dispersed thereon an oxygen storage component which is an oxide of a metal selected from the group consisting of iron, nickel, cobalt, the rare earths and mixture thereof. Illustrative of the rare earths contemplated as within the scope of this invention are cerium, lanthanum, neodymium, europium, holmium, ytterbium, praesodymium, dysprosium, and mixtures thereof. Preferred rare earths include cerium, lanthanum and mixtures thereof. The oxygen storage component is present as the oxide of the metals enumerated above and may be dispersed thereon by methods well known in the art. For example, one method of dispersing an oxygen storage component onto said first support is to impregnate the first support with an aqueous solution of a decomposable compound of said oxygen storage component, drying and calcining in air the resultant mixture to give a first support which contains an oxide of said oxygen storage component. Examples of water soluble decomposable oxygen storage components which can be used include but are not limited to cerium acetate, lanthanum acetate, neodymium acetate, europium acetate, holmium acetate, yttrium acetate, praesodymium acetate, dysprosium acetate, iron acetate, cobalt acetate, nickel acetate, cerium nitrate, lanthanum nitrate, neodymium nitrate, europium nitrate, holmium nitrate, yttrium nitrate, praesodymium nitrate, dysprosium nitrate, iron nitrate, cobalt nitrate, nickel nitrate, cerium chloride, lanthanum chloride, neodymium chloride, europium chloride, holmium chloride, yttrium chloride, praesodymium chloride, dysprosium chloride, iron chloride, cobalt chloride, and nickel chloride.

It is desirable that the oxygen storage component be present in an amount ranging from about 0.5 to about 60 weight percent of the first support and more preferably from about 5 to about 50 weight percent.

Accordingly, in one specific example an appropriate amount of alumina is added to an aqueous solution of cerium acetate. This mixture is then dried and calcined in air at a temperature of about 400° to about 700° C. for a time of about one to three hours. This resulted in the formation of cerium oxide which is well dispersed throughout the alumina.

When a monolithic carrier is used, the oxygen storage component may be deposited onto the support as described above and the support then deposited onto the monolithic carrier. Alternatively, the refractory oxide support may be deposited onto the monolithic carrier and then the oxygen storage component deposited thereon. Thus, a monolithic carrier may be dipped into a solution of a compound of the desired oxygen storage component, dried and calcined, thereby forming the oxide of the desired oxygen storage component on the refractory oxide support.

Alternatively, a solid form of said oxygen storage component may be mixed with the appropriate amount of said first support. After mixing, a homogeneous mixture of the two solids is obtained. The criteria required of the solid form of said oxygen storage component are that (1) it be insoluble in water and in the mineral acid/water solution used to prepare a slurry as described above, and (2) if the solid is not the metal oxide that said solid decompose to the oxide upon calcination in air. Examples of these insoluble solids include cerium sulfate, lanthanum sulfate, neodymium sulfate, europium sulfate, holmium sulfate, yttrium sulfate, iron sulfate, cobalt sulfate, nickel sulfate, cerium oxalate, lanthanum oxalate, neodymium oxalate, europium oxalate, holmium oxalate, yttrium oxalate, iron oxalate, nickel oxalate, cobalt oxalate, cerium oxide, lanthanum oxide, neodymium oxide, europium oxide, holmium oxide, yttrium oxide, iron oxide, nickel oxide, cobalt oxide with the oxides being preferred. Thus a specific example consists of adding cerium oxide to an alumina powder.

In addition to an oxygen storage component, the refractory inorganic oxide has dispersed thereon at least one noble metal component selected from the group consisting of platinum, palladium, rhodium, ruthenium and iridium. The noble metal component may be dispersed on said first support by several methods well known in the art including coprecipitation, cogellation, ion exchange or impregnation. Of these methods one convenient method of dispersing said noble metal component on said first support is impregnation of said first support with an aqueous solution of a decomposable compound of said noble metal, drying and calcining in air to give a fine dispersion of said noble metal on said first support.

Illustrative of the decomposable compounds of said noble metals are chloroplatinic acid, ammonium chloroplatinate, hydroxy disulfite platinum (II) acid, bromophatinic acid, platinum trichloride, platinum tetrachloride hydrate, platinum dichlorocarbonyl dichloride, dinitrodiamino platinum, sodium tetranitroplatinate, rhodium trichloride, hexaaminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diaminepalladium hydroxide, tetraaminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride, ruthenium tetrachloride, hexachlororuthenate, and hexaamineruthenium chloride. Of the compounds enumerated above, the following are preferred for dispersing the desired noble metal: chloroplatinic acid, rhodium chloride, chloropalladic acid, hexachloroiridate (IV) acid and hexachlororuthenate.

When more than one noble metal is desired to be dispersed on the first support, the metal coupounds can be impregnated using a common aqueous solution or separate aqueous solutions. When separate aqueous solutions are used, impregnation of the first support with the noble metal solutions can be performed sequentially in any order. Finally, hydrochloric acid, nitric acid or other suitable materials may be added to said solutions in order to further facilitate the uniform distribution of the noble metal components throughout said first support.

When said first support is to be deposited on a solid monolithic carrier, said first support may be impregnated with said aqueous noble metal solution either before or after the first support is deposited on said solid monolithic carrier. Of the two procedures, it is more convenient to impregnate the noble metal onto the first support after it has been deposited on said solid monolithic carrier.

It is desirable that the noble metal be present on said first support in a concentration ranging from about 0.01 to about 4 weight percent of said first support. Specifically, in the case of platinum and palladium the range is from about 0.1 to about 4 weight percent. In the case of rhodium, ruthenium and iriduium, the range is about 0.01 to about 2 weight percent. If both platinum and rhodium are present, the ratio of the platinum to rhodium content is from about 2:1 to about 20:1 platinum:rhodium. The same is true if palladium and rhodium are present.

For three component control operation, it is desirable that the catalytic composite contain a combination of rhodium and platinum, palladium or mixtures thereof. Specific combinations include platinum and rhodium, palladium, platinum and rhodium, and palladium and rhodium. However, under certain circumstances, e.g. when control of nitric oxide is not necessary, it is undesirable (from an economic consideration) for the catalytic composite to contain rhodium. In that case it is desirable for the catalytic composite to contain platinum, palladium and mixtures thereof. It is important to point out that a catalyst containing only palladium as the catalytic metal (plus a lanthana overlayer) has been found to have sufficient nitric oxide conversion activity that it can be used as a three way catalyst.

A third feature of the catalytic composite of this invention is an overlayer comprising lanthanum oxide and optionally a second support which is a refractory inorganic oxide. This overlayer is dispersed immediately thereover said first support containing at least one noble metal component and an oxygen storage component. If a second support is present in the overlayer, said second support may be selected from the group consisting of alumina, silica, titania, zirconia, aluminosilicates, and mixtures thereof, with alumina being preferred.

The overlayer of lanthanum oxide may be applied to said first support by means known in the art such as using a colloidal dispersion of lanthanum oxide, impregnating with a lanthanum compound that does not penetrate into the micropores of the first support, etc. When the overlayer also contains a second support, the lanthanum oxide may be dispersed onto the second support in the same manner (described above) used to disperse the oxygen storage component onto the first support.

When the catalytic composite is to be used in the form of a solid monolithic carrier, one method of applying said overlayer is to prepare a slurry of the lanthanum oxide or lanthanum oxide dispersed on a second support and apply said slurry immediately over the first support containing at least one noble metal and at least one oxygen storage component which has been deposited on said monolithic support; said overlayer may be applied in the same manner as described above for the first support.

It is desirable to apply an overlayer such that the concentration of lanthanum oxide is from about 1 to about 100 weight percent of said first support and preferably from about 10 to about 100 weight percent. Additionally, when the overlayer also contains a second support, said second support is present in a concentration of about 5 to about 80 weight percent of said overlayer. More preferably, the concentration of said second support is about 30 to about 70 weight percent of said overlayer.

When particulate form is desired, said lanthanum oxide may be separated from the noble metals by controlling the penetration depth of the noble metals into the interior of the particulates. For example, the noble metals can be made to penetrate into the interior of the spheres or other particulate form by means well known in the art such as the adding of chloride ions or a carboxylic acid to the impregnating solution. Subsequently, the lanthanum oxide may be place on or near the surface of the spheres or particulates by means as described above, i.e., using a colloidal dispersion of the lanthanum oxide or using lanthanum compounds which do not penetrate into the micropores of the spheres (such as the $\beta$-diketone complexes of lanthanum).

Thus, the resultant catalytic composite is characterized by the noble metal component being separated from the lanthanum oxide. As mentioned above this configuration of the noble metal and lanthanum oxide is contrary to the prior art which teaches that an intimate mixture of the noble metal and lanthanum oxide is necessary in order for the catalytic composite to effectively treat an automotive exhaust gas.

Another embodiment of the instant invention is a process for treating automotive exhaust while minimizing hydrogen sulfide formation. The process comprises contacting the automotive exhaust with the above-described catalytic composite. This process is usually accomplished by placing the catalytic composite in a container, known in the art as a converter, which is then placed in the exhaust system of the automobile. As part of this process the catalytic composite can oxidize hydrocarbons and carbon monoxide present in the exhaust to carbon dioxide and water and reduce nitric oxide to nitrogen. The oxidation and reduction reactions can proceed simultaneously if the composition of the exhaust gas is maintained at or near the stoichiometric air-to-fuel (A:F) ratio. However, even if the A:F ratio of the exhaust gas is maintained at stoichiometry, there will be times when the A:F ratio will be fuel rich. As stated hereinbefore, it is during these fuel rich excursions that hydrogen sulfide is formed and released. The use of the instant catalyst in such a process will minimize the formation and release of hydrogen sulfide.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

A conventional catalytic composite was prepared by the following method. In a beaker 7,000 grams of pseudo-boehmite alumina and 33,500 grams of a solution of cerium acetate were mixed, which solution contained 7 weight percent cerium. The resultant mixture was stirred for 30 minutes, transferred to a shallow tray, dried for 4 hours at 150° C. and finally calcined at 540° C. for 1 hour. The calcined alumina/cerium oxide powder was next stirred into a container which contained 5.33 liters of water and 48 mL of concentrated nitric acid ($HNO_3$). This mixture was ball milled for 6 hours.

An oval shaped cordierite monolith with a minor axis of 3.18 inches (8.08 cm), a major axis of 6.68 inches (16.97 cm), a length of 6.0 inches (15.24 cm) and having 400 square channels per square inch of facial area was dipped into the above described slurry. After dipping, the excess slurry was blown out with an air knife. The slurry coated monolith was calcined for about 1 hour at 540° C. The above described dipping, blow-out and calcining steps were repeated until the monolith contained 128 g of coating per liter of monolith volume.

Next palladium and rhodium metals were impregnated onto the above-described washcoated monolith. The above-described monolith was dipped into an aqueous solution containing 1.1 mg of palladium (as chloropalladic acid) per gram of solution and 0.3 mg of rhodium (as rhodium chloride) per gram of solution and 5 weight percent sugar. After dipping, the impregnated monolith was dried and calcined for about one hour at 540° C. This catalytic composite was designated Catalyst A. The calculated composition of Catalyst A in units of g/liter was: Pd=0.59; Rh=0.12; Ce=36.4.

EXAMPLE II

A catalytic composite of the present invention was prepared as follows. In a beaker 7,000 grams of pseudo-boehmite alumina and 33,500 grams of a solution of cerium acetate were mixed, which solution contained 7 weight percent cerium. The resultant mixture was stirred for 30 minutes, transferred to a shallow tray, dried for 4 hours at 150° C. and finally calcined at 540° C. for 1 hour. The calcined alumina/cerium oxide powder was next stirred into a container which contained 5.33 liters of water and 48 mL of concentrated nitric acid ($HNO_3$). This mixture was ball milled for 6 hours.

An oval shaped cordierite monolith with a minor axis of 3.18 inches (8.08 cm), a major axis of 6.68 inches (16.97 cm), a length of 6.0 inches (15.24 cm) and having 400 square channels per square inch of facial area was dipped into the above-described slurry. After dipping, the excess slurry was blown out with an air gun. The slurry coated monolith was calcined for about 1 hour at 540° C. The above-described dipping, blow-out and calcining steps were repeated until the monolith contained 128 g of coating per liter of monolith. Next, palladium and rhodium metals were impregnated onto the abovedescribed washcoated monolith. The above-described monolith was dipped into an aqueous solution containing 1.1 mg of palladium (as chloropalladic acid) per gram of solution and 0.3 mg of rhodium (as rhodium chloride) per gram of solution and 5 weight percent sugar. After dipping, the impregnated monolith was dried and calcined for about one hour at 540° C.

An overcoat containing lanthanum oxide was prepared as follows. In a container there were mixed 10,000 g of alpha alumina (from the Alcan Co.) and 20,800 g of lanthanum nitrate. The resultant mixture was mixed thoroughly, dried for about 4 hours at 150° C. and then calcined at 540° C. for 1 hour.

In a container there were mixed 11,000 g of the above La/alpha alumina powder and 3,300 g of gamma alumina. Enough water and nitric acid was added to give a slurry with a pH of 3.7 and a specific gravity of about 1.4. This slurry was ball milled for 6 hours and then used to coat the monolith as described above. The amount of overcoat on the monolith was 87 g of overcoat per liter of monolith volume and the amount of lanthanum was calculated to be 14.1 g/l. The calculated amounts of Pd, Rh and Ce were 059; 0.12 and 36.4 g/l respectively. This catalytic composite was designated Catalyst B.

EXAMPLE III

The following tests were conducted to evaluate the performance of catalysts A and B. Catalysts A and B were individually mounted in a converter and each converter was placed in the exhaust stream from one bank of V-8 gasoline fueled engine. The engine which was a Ford 5.0L V-8 engine equipped with dual throttle body fuel infectors was operated according to the following cycle. The duability cycle consisted of a 60 second cruise mode and a 5 second fuel cut mode. During the cruise mode, the engine operated at stoichiometry while during the fuel cut mode, the engine operated at a fuel lean condition that included a temperature and an oxygen spike. The fuel cut mode is achieved by breaking the circuit between one of the fuel injectors and the Electronic Engine Control. The engine speed and load on the engine was adjusted to give an inlet exhaust gas temperature of 760° C. during the cruise mode and 704° C. during the fuel cut mode. This cycle was repeated for 100 hours.

After Catalysts A and B were durability tested, they were evaluated as follows. The evaluation test was performed using an engine dynamometer which measures the performance of the catalyst (hydrocarbon, carbon monoxide, and nitric oxide) as a function of air/fuel (A/F). The test involved evaluating the catalyst at seven different A/F ratio points (14.80, 14.65, 14.55, 14.45, 14.35, 14.20 and 14.10) at an inlet temperature of 450° C. At each A/F point, the air/fuel was oscillated plus or minus 0.1 A/F at one Hertz frequency. Conversions of hydrocarbon, carbon monoxide and nitric oxides were calculated at each A/F and then an integral performance conversion was obtained by averaging the conversions between an A/F at 14.41 to 14.71.

The results of this evaluation are presented in Table 1.

TABLE 1.

Effect of Lanthanum Oxide Overlayer on Catalyst Performance after 100 Hours of Durability Testing

| Catalyst | Integral Conversion (%) | | |
|---|---|---|---|
| | HC | CO | $NO_x$ |
| A(No Overlayer) | 90 | 77 | 76 |
| B($La_2O_3$ Overlayer) | 90 | 82 | 81 |

The results presented in Table 1 clearly show that the catalyst with the $La_2O_3$ overlayer has better CO and $NO_x$ conversion performance than the catalyst without a $La_2O_3$ overlayer.

EXAMPLE IV

A catalyst was prepared according to Example 1 except that the noble metals were Pt and Rh. The Pt was impregnated using a chloroplatinic acid solution (1.05 mg Pt/g of solution). This catalyst was designated Catalyst C and had a calculated composition of Pt, Rh and Ce of 0.59; 0.12 and 36.4 g/l respectively.

EXAMPLE V

A catalyst was prepared according to Example II except that the noble metals were Pt and Rh. The Pt was impregnated using a chloroplatinic acid solution (1.05 mg Pt/g of solution. This catalyst was designated Catalyst D and was calculated to contain 0.59 g/l of Pt; 0.12 g/l of Rh, 36.4 g/l of Ce and 14.1 g/l of La.

EXAMPLE VI

A sample was prepared according to Example IV except that the alumina was also impregnated with lanthanum acetate and barium acetate in order to disperse lanthanum oxide and barium oxide on the alimina. This catalyst was designated catalyst E and had a calculated composition of 0.59 g/l Pt; 0.12 g/l Rh; 36.4 g/l Ce; 14.1 g/l La and 6.4 g/l Ba.

EXAMPLE VII

Catalysts C, D, and E were tested for $H_2S$ release according to the following test. Each catalyst was placed in a reactor and preconditioned at 566° C. for fifteen minutes with the precondition gas stream of Table 2. Next, a fuel lean gas stream (identified as storage in Table 2) was flowed over the catalyst for 30 minutes and at 513° C. At the end of the storage period, the gas stream exiting from the catalyst was bubbled through a container containing 100 mL of zinc acetate. At this point the feed gas was changed from lean to rich (release gas in Table 2) allowing the catalyst to release $H_2S$. The rich feed gas was flowed over the catalyst for 80 seconds and then the zinc chloride solution was tested for $H_2S$ content using a modified version of a colorimetric method established by the Environmental Protection Agency (EPA) which is available from the EPA as interim report EPA-600/2-80-068. The results from these tests are presented in Table 3.

TABLE 2

| | Feedgas Concentrations (Volume %) | | |
|---|---|---|---|
| COMPONENT | PRE-CONDITION | STORAGE | RELEASE |
| HC* | 0.076 | 0.076 | 0.076 |
| $H_2$ | 0.357 | 0.337 | 0.950 |
| CO | 1.429 | 1.350 | 3.800 |
| $O_2$ | 0.965 | 1.250 | 0.700 |
| $NO_x$ | 0.110 | 0.110 | 0.110 |
| $CO_2$ | 12.000 | 12.000 | 12.000 |
| $SO_2$ | 0.000 | 0.003 | 0.003 |
| $N_2$ | BALANCE | BALANCE | BALANCE |
| A/F RATIO | 14.56 | 14.80 | 13.41 |

*The hydrocarbon was a 2:1 mixture of propylene and propane.

TABLE 3.

| $H_2S$ Released by Catalysts | |
|---|---|
| Catalyst I.D. | $H_2S$ Released (ppm) |
| C (No Overlayer) | 786 |
| D ($La_2O_3$ Overlayer) | 428 |
| E ($La_2O_3$ in the alumina first support) | 777 |

As the results in Table 3 indicate, the presence of a $La_2O_3$ overlayer significantly reduces the amount of $H_2S$ which a catalyst releases versus lanthanum oxide present in the first support in close proximity with the noble metals. The lanthanum oxide overlayer catalyst also releases less $H_2S$ than a catalyst without any lanthanum oxide. Thus, not only does a $La_2O_3$ overlayer improve conversion efficiency, but it also reduces $H_2S$ formation and/or release.

EXAMPLE VII

A catalyst was prepared according to Example 1 except that the noble metal was palladium and was calculated to be present in an amount of 7.8 g/l. This catalyst was designated catalyst F.

A catalyst was prepared according to Example II except that the noble metal was palladium and was calculated to be present in an amount of 7.8 g/l. This catalyst was designated catalyst G.

Catalysts F and G were durability tested and evaluated according to Example III. This results of the evaluation are presented in Table 4.

TABLE 4.

Effect of Lanthanum Oxide Overlayer on Catalyst Performance after 100 Hours of Durability Testing

| Catalyst | Integral Conversion (%) | | | Conversion at A/F = 14.25 | | |
|---|---|---|---|---|---|---|
| | HC | CO | $NO_x$ | HC | CO | $NO_x$ |
| F(Pd-Only No Overlayer) | 93 | 76 | 72 | 49 | 15 | 29 |
| G(Pd-Only $La_2O_3$ Overlayer) | 93 | 79 | 76 | 57 | 18 | 51 |

As the data in Table 4 indicate under rich conditions, the catalyst containing a lanthana overlayer is much more effective at converting nitric oxide than a catalyst without an overlayer. This trend is also observed for integral conversion although not as pronounced. Additionally, in another test designed to measure conversion as a function of temperature, (light-off performance) the catalyst with the overlayer (catalyst G) reached 50% conversion for all three components at a lower temperature (at least 60° C. lower) than the catalyst without an overlayer (catalyst F).

What is claimed is:

1. A catalytic composite for treating an exhaust gas, said catalytic composite a first support having dispersed thereon an oxygen storage component and at least one noble metal component selected from the group consisting of platinum, palladium, rhodium, ruthenium and iridium and having dispersed immediately thereon an overlayer comprising lanthanum oxide and optionally a second support, said first and second support both being a refractory inorganic oxide selected from the group consisting of alumina, silica, titania, zirconia, aluminosilicates and mixtures thereof.

2. The catalytic composite of claim 1 where said first support is in the shape of pellets.

3. The catalytic composite of claim 1 where said first support is deposited on a solid ceramic or metallic honeycomb monolithic carrier.

4. The catalytic composite of claim 1 where said first support is alumina.

5. The catalytic composite of claim 1 where the noble metal component is platinum, palladium or a mixture thereof, each metal present in a concentration in the range of about 0.01 to 4 weight percent of said first support and optionally rhodium in a concentration of 0.01 to 2 weight percent of said first support.

6. The catalytic composite of claim 5 where the noble metals are a mixture of platinum and rhodium.

7. The catalytic composite of claim 5 where the noble metals are a mixture of palladium and rhodium.

8. The catalytic composite of claim 5 where the noble metals are a mixture of platinum, palladium and rhodium.

9. The catalytic composite of claim 1 where the noble metal is palladium and is present in a concentration of about 0.01 to 4 weight percent of the first support.

10. The catalytic composite of claim 1 where the lanthanum oxide in the overlayer is present in a concentration of about 1 to about 100 weight percent of said first support.

11. The catalytic composite of claim 1 where said second support is present in a concentration of about 5 to about 80 weight percent of said overlayer.

12. The catalytic composite of claim 1 where said oxygen storage component is an oxide of a metal selected from the group consisting of iron, nickel, cobalt, the rare earths and mixtures thereof.

13. The catalytic composite of claim 12 where said oxygen storage component is a rare earth oxide.

14. The catalytic composite of claim 13 where said oxygen storage component is cerium oxide and is present in a concentration from about 0.5 to about 60 weight percent of the first support.

15. The catalytic composite of claim 1 where said second support is selected from the group consisting of alumina, silica, titania, zirconia, and aluminosilicates.

16. The catalytic composite of claim 15 where said second support is alumina.

* * * * *

UNITED STATES PATENT AND TRADEMARK OFFICE
CERTIFICATE OF CORRECTION

PATENT NO. : 4,923,842

DATED : May 8, 1990

INVENTOR(S) : Summers et al.

It is certified that error appears in the above-identified patent and that said Letters Patent is hereby corrected as shown below:

Column 1, line 57: "noticable" should read --noticeable--

Column 2, line 45: "than a similar without" should read --than a similar catalyst without--

Column 4, line 50: "carried" should read --carrier--

4, line 60: "mixture" should read --mixtures--

Column 7, line 57: "place" should read --placed--

Column 9, line 53: "infectors" should read --injectors--

Column 10, line 49: "alimina" should read --alumina--

Column 12, line 9: "composite a first" should read --composite comprising a first--

Signed and Sealed this

Twenty-fourth Day of December, 1991

Attest:

HARRY F. MANBECK, JR.

Attesting Officer     Commissioner of Patents and Trademarks